Figure 1:
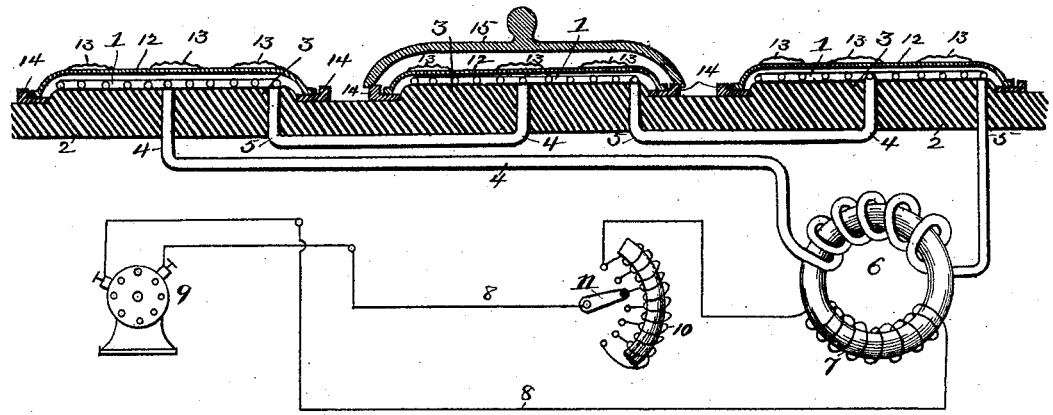

(No Model.) 3 Sheets—Sheet 1.

E. E. RIES.
ELECTRIC SOLDERING.

No. 485,017. Patented Oct. 25, 1892.

Witnesses:
J. B. McGirr.
F. T. Chapman

Inventor,
Elias E. Ries,
By Joseph Lyons.
Attorney.

(No Model.) 3 Sheets—Sheet 2.
E. E. RIES.
ELECTRIC SOLDERING.

No. 485,017. Patented Oct. 25, 1892.

Witnesses:
J. B. McGirr
F. T. Chapman

Inventor,
Elias E. Ries,
By Joseph Lyons
Attorney (No Model.) 3 Sheets—Sheet 3.

E. E. RIES.
ELECTRIC SOLDERING.

No. 485,017. Patented Oct. 25, 1892.

Witnesses:
J. B. McGirr.
F. T. Chapman

Inventor,
Elias E. Ries,
By Joseph Lyons
Attorney

UNITED STATES PATENT OFFICE.

ELIAS E. RIES, OF BALTIMORE, MARYLAND, ASSIGNOR TO RIES & HENDERSON, OF SAME PLACE.

ELECTRIC SOLDERING.

SPECIFICATION forming part of Letters Patent No. 485,017, dated October 25, 1892.

Application filed July 17, 1891. Serial No. 399,853. (No model.)

*To all whom it may concern:*

Be it known that I, ELIAS E. RIES, a citizen of the United States, and a resident of Baltimore, in the State of Maryland, have invented certain new and useful Improvements in Soldering by Heat Radiation, of which the following is a specification.

My invention has reference to improvements in the method of and apparatus for soldering or fusing circumscribed metallic ornaments onto the more extended surfaces of metallic objects by heating these objects by radiation instead of by conduction, as has heretofore been practiced.

My invention is more particularly adapted, although not confined, to the soldering or fusing onto the exposed surfaces of ornamental plates or shells of jewelry—such as watch-cases, for instance—engraved or embossed thin plates of precious metals, sometimes designed to constitute in themselves the ornamentation of the surface to which they are soldered and sometimes shaped to receive and hold precious stones of various colors, which latter, in conjunction with the small plates and with the surface of the more extended plate or shell, then constitute the ornamentation. Heretofore such soldering was generally accomplished by preparing the under sides of the ornamental projections by coating them with the solder required, then placing them in the positions which they are designed to finally occupy upon the exposed surface of the plate or shell, and then heating the whole (shell and ornaments) by the flame of a blow-pipe, which must be dexterously made to play over the whole shell until the same is sufficiently heated to melt the solder of the ornaments without displacing the latter by the current of the ignited gases which constitute the flame. This manipulation is exceedingly difficult. It requires great skill, and the process is frequently miscarried by displacement of the very light ornaments, caused by the current of the flame when the same happens to be too strong, more especially when the surface to be ornamented is curved. By my invention the process is freed from all these difficulties, since by the same no flame is applied, thus avoiding the danger of displacement of the ornaments, and no highly-skilled labor is required. The time for ornamenting in the manner above described is also considerably reduced, since the heating of the plate or shell is effected at all points at the same time, and not, as by the old process, from point to point successively. As a consequence thereof a number of little ornaments can be soldered to the surface of the plate or shell almost at the same instant, while by the old process it has been found impossible to effect this result, since the solder of one ornamental projection would ordinarily melt before that of the other projection began to fuse, thus requiring careful judgment on the part of the operator as to the precise point upon which the flame of the blow-pipe must be made to impinge from moment to moment.

My process may be described in a general way as consisting of heating a base shaped to conform to the general outline and curvature of the plate to be ornamented and heating the latter by radiation from the former after the ornamental projections have been disposed upon the surface and properly prepared with solder. The base by which the heat is imparted to the plate to be ornamented I shall hereinafter call a "radiator," while the object to be ornamented I shall call the "work."

In accordance with my invention I may heat the radiator in any desired manner; but by preference it is done electrically by the passage of an electric current or currents of the proper volume through the body of the radiator, since in this manner the radiator may be heated almost instantaneously to any desired degree of temperature, and may be maintained at that temperature for an indefinite period of time. All this will more fully appear from the following detailed description of my improved method and apparatus, with reference to the accompanying drawings, in which I have illustrated the apparatus in its more general form and also several specific forms which the same may assume.

Figure 2:
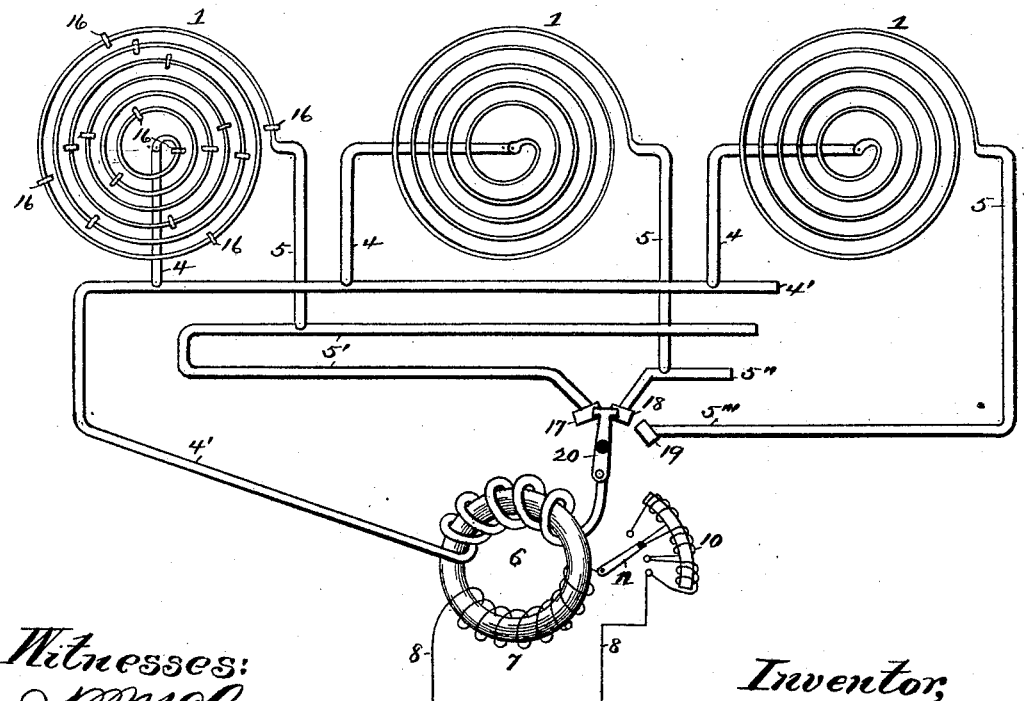
Figure 3:
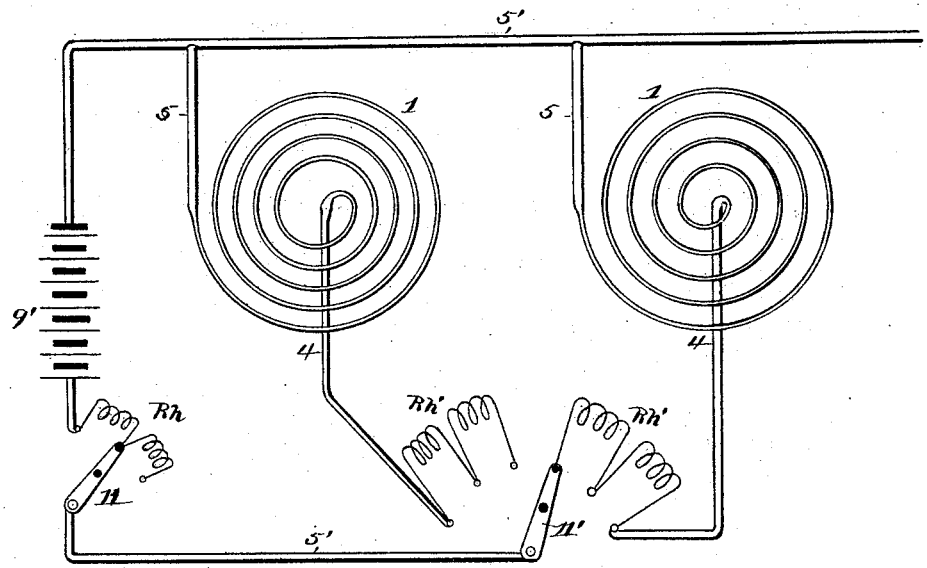
Figure 4:
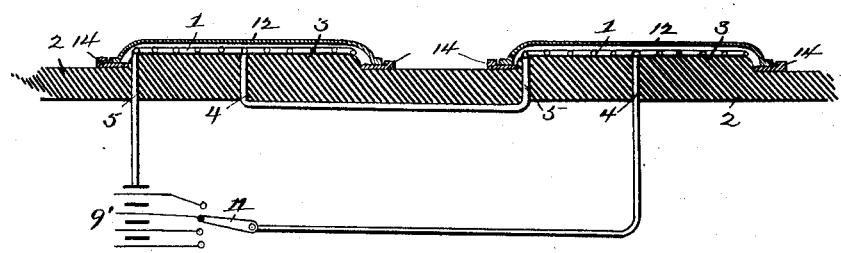
Figure 5:
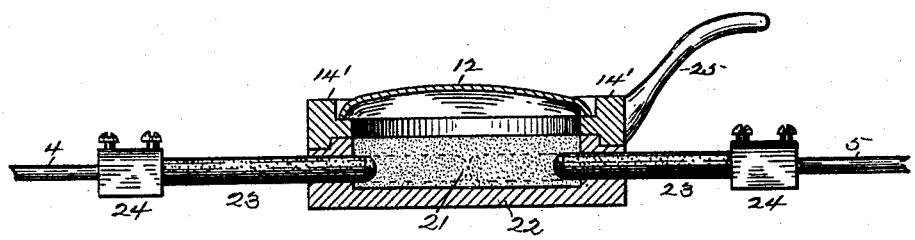
Figure 6:
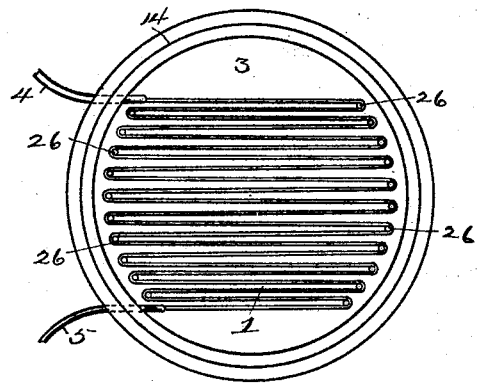

Figure 1 is a vertical section of a convenient form of my improved soldering apparatus with the source of electric current and circuit connection represented diagrammatically. Fig. 2 is a diagram representing modified circuit connections used with my improved soldering apparatus. Fig. 3 is a like view of still another form of my apparatus. Fig. 4 is a vertical section showing two soldering-radiators connected in series and supplied with current from a primary or secondary battery. Fig. 5 is a vertical section of a soldering apparatus embodying my improvement, in which the radiator is composed of granulated carbon. Fig. 6 is a plan view of a modified form of the radiator shown in Figs. 1 to 4, and Fig. 7 is a perspective view of a soldering apparatus designed for work on hollow cylinders.

Like numerals and letters of reference indicate like parts all throughout the drawings.

Referring now more particularly to Figs. 1 to 4, my soldering-radiators 1 1, &c., are shown as mounted upon insulating and refractory base 2, which may be a plate of lava, slate, marble, soapstone, or plaster-of-paris, or asbestus, although it will be understood that I am not restricted to the use of the materials specified. These plates have formed upon their surfaces raised portions 3, which in general outline conform to the shape of the work upon which the soldering is to be done, and upon these raised portions are mounted the radiators 1, which consist of spirals of wire of some highly-refractory metal, such as platinum, although in some cases I may use less refractory metals, such as German silver, aluminum, bronze, or iron. In many cases it is practical to use a spiral of a thread of carbon of suitable thickness, in which case the carbon will be of the kind known as "plastic" or "Bunsen" carbon. The two ends of each spiral radiator are connected with rather stout feeding-conductors 4 5, which by preference pass through the body of the base 2, and which are designed to carry an electric current or electric currents of such volume and potential to the radiators as to heat the same to any desired degree of incandescence.

In Fig. 1 the proximate source of the electric current is an inductional transformer 6, the secondary coil of which is directly connected with the feeding-conductors 4 5, while the primary 7 of the transformer is connected by conductors 8 8 with an alternating-current dynamo 9, a reaction or choking coil 10 being included in that circuit and provided with a switch-arm 11, whereby the circuit may be closed and opened and the current graduated and regulated, as will be readily understood by those skilled in the art.

In the arrangement shown in Fig. 1 it will be seen that the inner terminal of one radiator is connected with the outer terminal of the next succeeding radiator, and while I have only shown three such radiators connected in series it will be understood that any number may be thus connected or that a single radiator may be used.

As has been stated above, the raised portions 3 of the base 2 are shaped to conform approximately to the shape of the work. Consequently the surface defined by the radiator will also approximate the shape of the work. In Figs. 1 and 4 the work is represented as a rather flat shell 12, which may be the half of a watch-case and may be either of silver or gold or of any other metal of which watch-cases are made; or the shell 12 may represent some other metallic structure which it is desired to ornament by soldering thereto ornamental metallic projections, which in the drawings are marked with the numeral 13. The raised portions 3 of the base 2 are each surrounded by an annulus 14, which is preferably made of the same material as the base, but not necessarily so. This annulus is so shaped as to accommodate and hold against displacement the work 12 and to hold this work as close as practicable to the radiator's surface without, however, touching the same. It will now be understood that if an electric current of sufficient power is passed through the conductors 4 5 the radiators will all be raised to the desired degree of incandescence, and they will be maintained in that state of incandescence so long as the circuit remains closed and the current unchanged. By reason of the close proximity of the under surface of the work to the surface of the radiator the work will readily be heated by simple radiation and not by convection of heat from the radiator and will be heated very uniformly and to a degree dependent upon the degree of incandescence to which the radiator has been brought, and, other things being equal, this degree of incandescence in turn will depend upon the strength of current which is permitted to pass through the radiator. By means of the reaction-coil 10 and switch 11 the amount of current is regulated with great ease and accuracy.

The manner of using this apparatus will now be clear to those skilled in the art. The work is first placed over the radiator in the manner shown in the drawings by placing it with its edge or edges into the annulus 14 or upon a number of ledges formed similar to the cross-section of the annulus. The ornamental projections 13 are then prepared on their under sides with solder of any desired kind and are then placed upon the work in the positions which they are designed to occupy permanently. The charging-circuit is then closed and the current regulated by properly manipulating the switch-arm 11, and within a few seconds the radiators will assume the desired temperature, and in a few seconds more the work will by radiation be brought up to the temperature required for fusing the solder, and thus uniting the ornamental projections with the work. It will be understood that if it should be necessary a flux suitable to the particular solder employed will be used. In this manner any number of ornamental projections can be soldered to the work in a very expeditious and cleanly manner.

Before admitting the current to the radiators it is practicable to place a cover 15, of a material which is both refractory and at the same time a poor conductor of heat, over the work to prevent the loss of heat by radiation into the ambient air. The use of such cover becomes practicable more especially in cases where a considerable number of the same articles is operated upon in succession, for under such circumstances the operator soon learns how many seconds will elapse between the moment when the circuit is closed and the moment when the soldering has been accomplished. It is therefore unnecessary that he should watch the progress of the work, and it is therefore also unnecessary that the cover 15 be made of transparent material, although it may be made of such material.

In Fig. 4 the source of current 9′ is represented as a primary or secondary battery. Preferably the latter is used, and the switch-arm 11 permits of inserting a greater or lesser number of cells, whereby the current can be regulated.

In the diagrammatic representation of my apparatus in Fig. 2 the radiator-spirals are represented as fastened to the supporting-base by staples 16, which staples will naturally be made of platinum, but, if sufficiently heavy, may also be made of iron or steel. For the purposes of my invention it is immaterial how the radiators are secured to the supporting-base. In this Fig. 2 the inner terminals 4 4 4 of the radiators are all connected to the same feeding-conductor 4′, while each outer terminal 5 5 5 is represented as connected with a separate conductor 5′ 5″ 5‴, the ends of which are expanded into contact-blocks 17, 18, and 19, respectively, and which are arranged in the path of the switch-arm 20, which in turn is connected with one terminal of the secondary coil of the transformer 6, the other terminal of which is connected with the conductor 4′. By operating this switch 20 any one of the radiators may be placed in circuit; or if the end of the switch-arm is wide enough, as represented in Fig. 2, two of the radiators may at the same time be placed in the circuit—that is to say, in parallel branches of the circuit, as will be readily understood by those skilled in the art.

In Fig. 3 the arrangement is such that the cells of the primary or secondary battery 9′ are arranged for tension and the current from the same is regulated by the rheostat R$h$ and switch-arm 11. This will regulate the maximum amount of current which may be used for any one of the two radiators shown, while the current to be actually used in each radiator is controlled by the rheostats R$h$′ and switch-arm 11′. It will at once be clear to those skilled in the art that in this manner the current used in either one of the two radiators is regulated independently of the current used in the other radiator.

In Fig. 5 I have illustrated a special form of soldering apparatus in which the radiator is composed of a mass of granulated carbon. The mass of granulated carbon 21 is contained in a shallow receptacle 22, made of fire-brick or other refractory substance, and which in this case corresponds to the raised portions 3 of the base 2 in Figs. 1 and 4. This receptacle 22 may be cylindrical or quadrangular, or may have any other desired shape. On diametrically-opposite points the walls of the receptacle are perforated, and through these perforations are inserted carbon rods 23 23, which can be moved toward and from each other with slight friction. These carbons constitute the terminals of an electric circuit, of which 4 and 5 are the feeding-conductors, and which are joined to the carbons by the connectors 24 24. An annulus 14′ is fitted upon the upper edge of the receptacle 22, and is provided with a handle 25, by which the annulus may be raised and removed from the receptacle. This annulus 14′ is recessed internally, thus forming an edge upon which the watch-case or other work 12 is held against displacement.

The apparatus is used in the following manner: The carbon rods are first inserted into the perforations in the walls of the receptacle and are brought into contact with each other at about the middle of the receptacle, as indicated in dotted lines. The receptacle is then filled with rather coarse granulated carbon. The work 12 is then placed upon the ledge of the annulus 14′, and the ornamental projections properly prepared are arranged upon the work in the positions which they are designed to occupy permanently. The annulus is then placed upon the edge of the receptacle and the electric circuit is closed. In this condition of the apparatus comparatively little heat will be generated at the contacts of the carbon rods, owing to the comparatively low resistance at these points. The carbons are then slowly moved apart to the positions indicated in solid lines, whereby a considerable resistance—namely, that of the granulated carbon—is introduced between the carbon-rod terminals. A high degree of heat is now generated in the granulated carbon, and by radiation from the same the work is rapidly heated to the desired temperature. When the solder has been fused, the annulus, together with the work, is removed from the receptacle and is allowed to cool, and simultaneously therewith the electric circuit may be broken. Owing to the high temperature which is thus obtained the granulated-carbon radiator is particularly adapted to hard-soldering. It will be understood that the annulus 14′, together with the handle 25, must be made of some refractory material, although it is quite practicable to make it of cast-iron, or even of brass.

In Fig. 6 a modified form of a radiator composed of a refractory-metal wire is illustrated. In this case 3 represents the raised portion of the refractory base, and 14 is the annulus for receiving and holding the work. The metal wire which constitutes the radiator proper is in this case not wound spirally, as in Figs. 1 to 4, but is stretched back and forth parallel to itself between pins 26. In all other respects this radiator is identical with those shown in Figs. 1 to 4.

Figure 7:
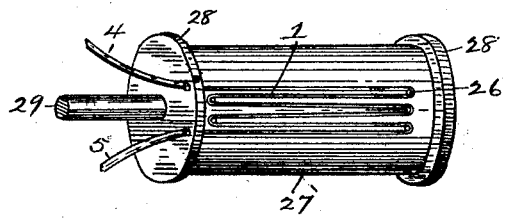

In Fig. 7 the radiator is disposed upon a cylindrical base 27, made of refractory material with flanges 28 at the ends, thus giving to the base the aspect of a bobbin. The radiator-wires 1 are in this case also stretched between pins 26 similar in this respect to the construction shown in Fig. 6, but occupying only a portion of the cylinder-surface. From one end of this cylinder, and preferably from the end from which the feeding-wires 4 5 extend, there also extends a rod 29, which is designed to be clamped in a vise or other holder in such a way as to present the radiator-wire horizontally on the upper surface of the cylinder.

It will be evident that napkin-rings and other hollow metallic cylinders may be slipped over the flanges of the radiator-base and thus bring a portion of such napkin-ring close to but not touching the radiator-wires, so that when current is passed through the radiator until it becomes incandescent it will heat by radiation a segment of the napkin-ring or other similar structure, upon the outer surface of which, therefore, ornamental projections may be soldered in the manner hereinbefore described.

I desire it to be understood that in the process hereinbefore described it is not always necessary to use a specially-prepared solder, since the ornamental or other plates or projections applied to the article may be of a metal having a lower fusing-point than the metal of the article itself, so that they may be fused onto the article without the interposition of a solder proper; nor is it necessary that a flux be used when the metals to be united are of a kind that will not readily oxidize in the open air when heated. My improved process therefore comprises not only soldering or brazing, but also fusing one metal onto the other without the use of a solder having a lower fusing-point than either of the metals to be united, and while for the sake of simplicity of expression is used the term "soldering" as designating my improved process, I desire it to be understood that by this term I mean to embrace the fusing of one piece of metal onto another, whether a solder is used or not.

It will be clear that my soldering-radiator may assume a great variety of forms without departing from the fundamental idea of my invention, that there is a wide range of shapes and materials which may be used, and that while I have shown and described my radiators as being heated by the electric current they may be heated in other ways without departing from my invention.

I am aware that when soldering is practiced in the ordinary manner by conduction of heat to the objects to be soldered together and to the solder, and when, as sometimes happens, the solder does not flow evenly and smoothly, but hardens in unsightly ridges and projections, the workman sometimes passes over those ridges with the soldering-iron, barely touching the same, so as to reheat them and cause them to subside and smoothen down. This, however, is an uncommon practice, and is not soldering at all, but is known in the art as the practice of "sweating down" the solder after the soldering has been completed and while the work is still quite hot. My invention has no reference to this practice of sweating down, and I make no claim to such practice.

Having now fully described my invention, I claim and desire to secure by Letters Patent—

1. The method of soldering metallic articles together, which consists in fusing the solder at the point or line of union by heat radiated from an electrically-heated body, substantially as described.

2. The method of soldering metallic articles together, which consists in fusing the solder at the point or line of union by heat radiated from an electrically-heated body to one of said articles and conducted to the solder, substantially as described.

3. A soldering apparatus consisting of a heat-radiator and a support made of a refractory poor conductor of heat for holding the article to be operated upon in effective heat-radiating proximity to the radiator, substantially as described.

4. A soldering apparatus consisting of a heat-radiator the surface of which approximately corresponds to the surface of the article operated upon and a support made of a refractory poor conductor of heat for holding the article in effective heat-radiating proximity to the radiator-surface, substantially as described.

5. A soldering apparatus consisting of an electric heater and a support of insulating refractory material for holding the article to be operated upon in effective heat-radiating proximity to the radiator, substantially as described.

6. A soldering apparatus consisting of an electric heater the radiating-surface of which approximately corresponds to the surface of the article operated upon and a support of insulating refractory material for holding the article in effective heat-radiating proximity to the radiating-surface, substantially as described.

7. A soldering apparatus consisting of a wire or thread of electric conducting material of high resistance disposed in devious lines upon an insulating refractory base, a support of insulating refractory material for holding the article to be operated upon in proximity to the wire or thread, an electric circuit, including the said wire or thread, and a generator for heating the latter by the passage of current therethrough, substantially as described.

8. An electric soldering apparatus consisting of a number of electric radiators, each provided with a support for holding the articles to be soldered within effective radiating proximity to the same, in combination with a source of current common to all the radiators, a regulator for determining the maximum current admitted to the radiators, and a switching apparatus for including the radiators in succession in the charging-circuit, substantially as described.

9. A soldering apparatus consisting of a heat-radiator, a support for holding the article operated upon in effective heat-radiating proximity of the radiator, and a removable transparent cover for the radiator and article for preventing heat radiation into the ambient air, substantially as described.

In testimony whereof I have signed my name to this specification in the presence of two subscribing witnesses.

ELIAS E. RIES.

Witnesses:
LEOPOLD RIES,
JNO. T. MADDOX.